United States Patent

[11] 3,614,636

[72] Inventor Broder Wendland
Pflugerstr. 1, 1 Berlin 44, Germany
[21] Appl. No. 861,297
[22] Filed Sept. 26, 1969
[45] Patented Oct. 19, 1971
[32] Priority Sept. 26, 1968
[33] Germany
[31] P 17 91 173.8

[54] DISTORTION CORRECTION CIRCUIT FOR LINEARLY DISTORTED PULSE SEQUENCES
7 Claims, 4 Drawing Figs.

[52] U.S. Cl. .......... 328/162, 328/160, 328/151
[51] Int. Cl. .......... H03b 1/00
[50] Field of Search .......... 328/162, 163, 164, 166, 151; 332/37

[56] References Cited
FOREIGN PATENTS
1,157,677 11/1963 Germany

*Primary Examiner*—Donald D. Forrer
*Assistant Examiner*—B. P. Davis
*Attorney*—Spencer & Kaye

ABSTRACT: A circuit for correcting linear distortions in a received signal pulse train by converting the pulse train into a signal sequence by periodically sampling the received train and storing each sample value until the next sampling, quantizing the sequence in discrete amplitude levels identical with those of the initial pulse train, sequentially delaying the quantized sequence, multiplying each delayed sequence by a correction value, adding all multiplied sequences to the initial sequence at the quantizing input, and modifying the correction values in a direction to establish equality between the sequence values before and after quantizing.

Inventor:
Broder Wendland
BY Spencer & Kaye
ATTORNEYS.

Inventor:
Broder Wendland
BY Spencer & Kaye
ATTORNEYS.

Inventor:
Broder Wendland
BY Spencer & Kaye
ATTORNEYS.

DISTORTION CORRECTION CIRCUIT FOR LINEARLY DISTORTED PULSE SEQUENCES

BACKGROUND OF THE INVENTION

The present invention relates to distortion correction circuits for linearly distorted pulse sequences.

The invention relates particularly to circuits of the type which includes a shift register to whose input is fed an input function derived from the distorted pulse sequence, the shift register being provided with a plurality of outputs at which the input function appears after different delay periods. The shift register is provided with evaluation members which can be regulated with respect to both polarity and amplitude and which are disposed between the outputs of the shift register and a summing circuit, and with a feedback loop through which the output of the summing circuit is connected with the input of the distortion correction circuit.

Such a distortion correction circuit is disclosed in German Pat. No. 1,157,677. Before this known circuit is described in detail with the aid of the drawings, the basic problems of pulse distortion in linearly distorting systems shall be discussed.

If a pulse is applied to the input of a practical transmission system, the resulting signal appearing at the output of this system is delayed somewhat with respect to the input signal and linear distortions inherent in the system produce a distorted main pulse and give rise to leading and trailing pulses. This distortion was first attempted to be compensated by the use of the so-called transverse filters. A transverse filter consists of a delay element which is provided with taps at which the input signal appears after a delay of one clock pulse period. With the known transverse filter it is possible, by means of evaluation members inserted between the taps and a summing circuit, to keep a certain time interval before and after the main pulses free of leading and trailing pulses. It is, however, not possible with this circuit to achieve a complete suppression of such pulses.

In the above-mentioned German patent there is disclosed an improved distortion correction circuit in which a complete suppression of the trailing pulses is realized with the aid of a feedback network. This distortion correction circuit is constructed as shown in FIG. 1 and is provided with an input E to which the distorted signal $y(t)$ is applied. Input E is connected to delay members 1 and 2 which each delay the applied signal by one clock pulse period. The outputs of the delay members and the input E of the circuit are connected through evaluation members 3, 4 and 5, respectively, to a summing circuit 6. At the output of the summing circuit 6 there is provided a series connection of further delay members 7 and 8 whose outputs are also connected with the input of the summing circuit 6 via respective further evaluation members 9 and 10. Through a further evaluation member 11, the output of the summing circuit 6 is also directly connected with its input. The corrected pulse function $Z(t)$ is taken from the output of the summing circuit.

A distortion correction circuit according to FIG. 1 can effect a complete suppression of the trailing pulses without requiring more delay members or evaluation members than the number of trailing pulses associated with a distorted input pulse. Advisably the distortion correction circuit according to FIG. 1 will be so designed that the delay members in front of the summing circuit remove the leading pulses, or advance them and attenuate them, and that the delay and evaluation members behind the summing circuit eliminate the trailing pulses.

Such a distortion correction circuit provides rather satisfactory results in the case of moderate linear distortions because it permits a complete suppression of the trailing pulses and because the leading pulses arising in transmission systems of the type under consideration generally do not present excessive distortions with respect to either their number or amplitude. It may be noted that the leading pulses are also attenuated to a certain extent with the described circuit and are thus rendered substantially harmless. However, if the signals fed to such known distortion correction circuit are distorted to a relatively large extent, it is possible, due to the feedback connection to the summing circuit, that the distortion correction circuit will become unstable and will thus no longer perform its intended function. The current demand for transmitting pulse trains at relatively high rates over less than ideal transmission paths in fact prevents the desired correction from being achieved by the known circuit.

SUMMARY OF THE INVENTION

It is a primary object of the present invention to overcome these drawbacks and difficulties.

A further object of the invention is to improve the stability of such correction circuits particularly for high pulse rates.

Still another object of the invention is to improve the completeness of such distortion correction.

These and other objects according to the invention are achieved by certain improvements in a distortion correction circuit for correcting linear distortions imparted during transmission to a signal pulse train composed of pulses having a predetermined number of discrete amplitude levels, which circuit includes: time delay means having an input and a plurality of outputs for imparting successive delays to a signal applied to its input and for delivering each successively delayed signal to a different respective output; a plurality of evaluation members each having an input connected to a respective output of the time delay means for modifying the signal applied to its input by a factor having an adjustable value; and summing means connected to receive the output signals from all of the evaluation members. According to the improvement of the invention, the summing means are also connected to receive a signal sequence obtained by periodically sampling the distorted signal pulse train and storing each sampled value until the next sampling, and the circuit comprises quantization means connected between the input of the circuit and the input of the delay means for quantizing the signal which it receives into a predetermined number of discrete amplitude levels identical to those of the signal pulse train before distortion.

The present invention enables stable operation of the distortion correction circuit disposed at the receiver end of the transmission path to be achieved even for very high transmission rates and large linear distortions.

There is no limitation of linear distortion which can be handled by the correction circuit according to the invention.

The present invention is based on the discovery that a quantization of the signals fed into the delay circuit, or the shift register, can impose stability on a distortion correction circuit even if a large feedback exists.

In an advantageous further development of the present invention, particularly with a view toward automatic adjustment of the evaluation members of the distortion correction circuit, each evaluation member consists of two multipliers and an integrator circuit, one input each of the two multipliers is connected with the output of the shift register associated with the respective evaluation member, the integrator circuit connects the output of one multiplier with the second input of the other multiplier, the output of the other multiplier is connected with the summing means, and the second input of the other multiplier is connected with a member for forming the difference between the input signal and the output signal of the quantization stage.

A particularly simple practical embodiment of the distortion correction circuit according to the present invention is achieved by constituting the multipliers by field effect transistors.

DESCRIPTION OF THE PREFERRED EMBODIMENTS

Figure 1:
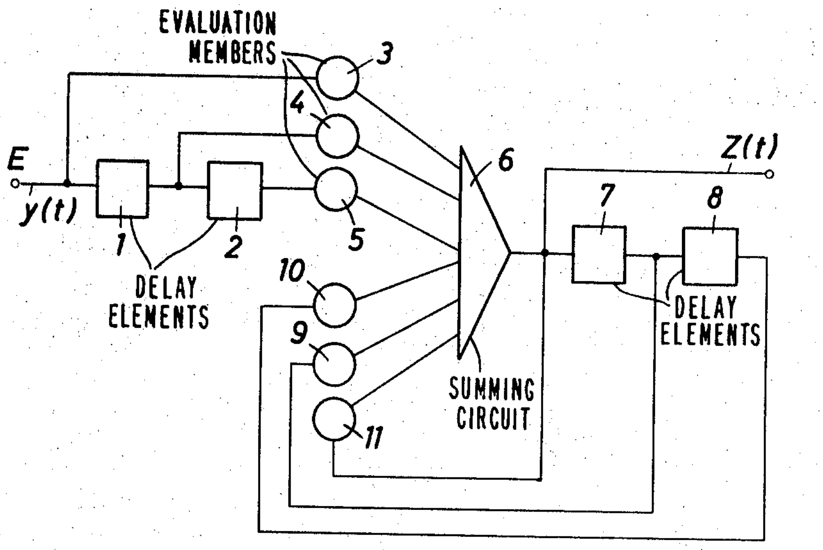
Fig. 1 PRIOR ART
FIG. 1 is a circuit diagram of a prior art distortion correction circuit and has already been described in detail.
Figure 2:
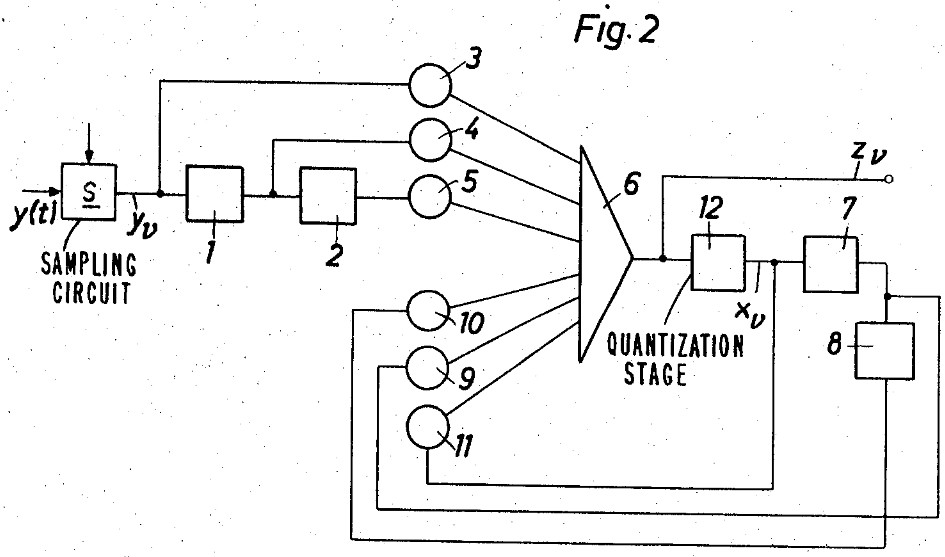
FIG. 2 is a circuit diagram illustrating the principle of a distortion correction circuit according to the present invention.

The distortion correction circuit according to the present invention as shown in FIG. 2 of the drawings differs externally from the known circuit of FIG. 1 only in that a quantization stage 12 is inserted into the feedback loop of the summing circuit. However, the operation of the distortion correction circuit according to the present invention is entirely different in principle from that of the known circuit.

Whereas the known circuit is connected to receive the distorted continuous pulse train signal y $(t)$, the circuit according to the invention is arranged to receive a signal train $y_\nu$ derived in sampling circuit 14 from the distorted pulse train y$(t)$ by sampling the amplitude of the signal y$(t)$ at the clock frequency 1/T at which the pulses are transmitted at the transmitting end and by storing the sampled amplitude until the next sampling moment, i.e. for one clock period T. The manner in which such a sampling circuit can be constructed will be readily apparent to those skilled in the art.

The signal sequence $y_\nu$, after being substantially freed from the interfering influences of the leading pulses, by means of delay members 1 and 2 and evaluation members 3 to 5, reaches a quantization stage 12 beyond the summing circuit 6. Stage 12 can be constituted by any well-known amplitude quantization device. At the output of the quantization stage 12 there appear only discrete amplitude values $x_\nu$. The number of possible amplitude values is equal to the number of amplitude stages employed at the transmitting end, e.g. in the simplest case of a binary signal there being two values representing the presence of a pulse or the absence of a pulse. It can be seen that, due to the fact that a certain limit is imposed on the number of possible amplitude values $x_\nu$ fed to the distortion correction circuit through the feedback loop, instabilities in the distortion correction circuit, which could arise in the known arrangements due to setting of the evaluation members, can be effectively prevented. Moreover, the use of the quantization stage 12 and the performance of the distortion correction on the sampled, stored values $y_\nu$, rather than on the signal y$(t)$, results in further advantages which will be discussed in connection with FIG. 3.

Figure 3:
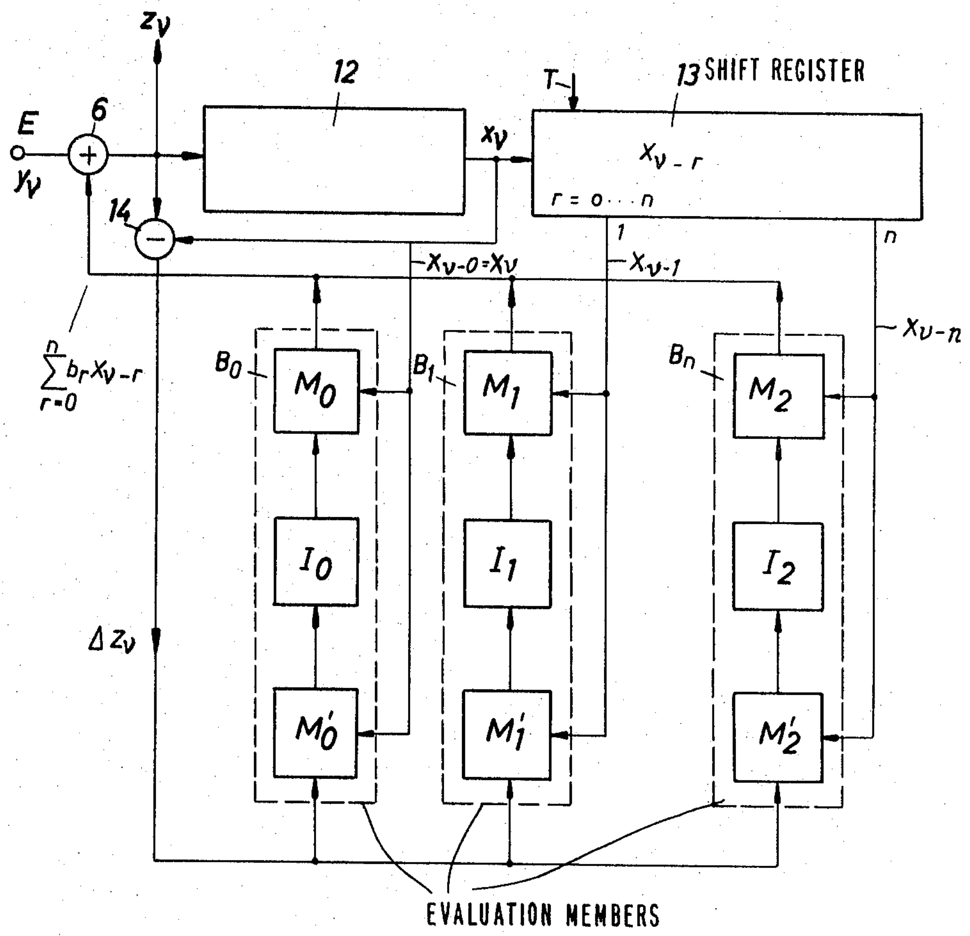
FIG. 3 is a block circuit diagram of one embodiment of a distortion correction circuit according to the present invention which produces automatic adjustment of the evaluation members.

In the embodiment of a distortion correction circuit according to the present invention as shown in FIG. 3, it is to be assumed that interfering influences of the leading pulses are either not present or have been eliminated as much as possible in a known manner, e.g. by the arrangement of elements 1-5 described earlier. The sampled, stored values $y_\nu$ of the linearly distorted signal y$(t)$ which only contains distortion-produced trailing pulses are to be fed to the input E of the distortion correction circuit.

The values $y_\nu$ are conveyed from input E of the distortion correction circuit through a summing circuit 6 to a quantization stage 12 and from there the resulting signal $x_\nu$ enters a shift register 13 whose $n$ individual stages correspond to delay members 7 and 8 of the circuit of FIG. 2.

The member $n$ of individual stages has to be equal to the member of those trailing pulses in the distorted signal $y_\nu$, which are wanted to be compensated.

The amplitude values $x_\nu$, which come from the output of the quantization stage 12, are shifted at the clock frequency 1/T through the stages of the shift register 13, which may contain, for example, capacitors as the storing members, the same chock frequency controlling the rate at which y$(t)$ is sampled to derive the values $y_\nu$. The output of the quantization stage 12 and the outputs of the shift register stages are connected to evaluation members $B_0$ to $B_n$ which correspond to the evaluation members 9 to 11 of FIG. 2. The output voltages of the evaluation members $B_0$ to $B_n$ are added in the summing circuit 6 to the sample values $y_\nu$.

The evaluation members $B_0$ to $B_n$ are constructed to be automatically regulated in the distortion correction circuit of FIG. 3. Although the complete circuit contains a total of $n$ evaluation members B, only the evaluation members $B_0$, $B_1$ and $B_n$ are shown for the sake of simplicity. Each evaluation member $B_r$, where $r$ has any value between 0 and $n$, consists of three elements, i.e. two multipliers $M_r$ and $M'_r$ and an integrator circuit $I_r$.

One input of each of multipliers $M_r$ and $M_r'$ is connected to the output of the associated shift register stage or, in the case of the evaluation member $B_0$, to the output of the quantization stage 12. The output of multiplier $M_r'$ is connected to the second input of multiplier $M_r$ via the integrator circuit $I_r$. In a subtraction circuit 14 the output signal $x_\nu$ of the quantization stage 12 is subtracted from its input signal $z_\nu$. The voltage $\Delta z_\nu$ now appearing at the output of the subtraction circuit 14 is fed to the second input of multiplier $M'_r$ of all of the evaluation members $B_0$ to $B_n$.

In explaining the automatic regulation of the evaluation members $B_0$ to $B_n$ it is advisable to start with the fact that when the coefficients $b_r$ are incorrect, the output signals $z_\nu$ differ somewhat from the quantized signals $x_\nu$. The incoming, linearly distorted signal $y_\nu$ contains the superpositions of the trailing pulses of the previously sent transmitting signals $x_{\nu-r}$, where $r$=0, 1,...$n$ and $n$ represents the number of trailing oscillations.

By use of the samples $a_r$=$a_0$; $a_1$;...$a_n$ of the transmission channel impulse response $a(t)$ and by means of the convolution integral the sum $$Y_\nu=\sum_{r=0}^{n} a_r x_{\nu-r} \qquad (1)$$

is obtained

This sum represents the sample of the distorted received signal and $$z_\nu=\sum_{r=0}^{n} a_r x_{\nu-r}+\sum_{r=0}^{n} b_r x_{\nu-r}=\sum_{r=0}^{n}(a_r+b_r)x_{\nu-r} \qquad (2)$$

is the output signal which is modified by the coefficients $b_r$ but not yet correctly regulated.

The difference $\Delta z$ between $z$ and the quantized signal $x$ is then, by derivation from equation (2):

$$\Delta z_\nu=\sum_{r=0}^{n}(a_r+b_r)x_{\nu-r}-x_\nu;$$

or $$\Delta z_\nu=\sum_{r=1}^{n}\underbrace{(a_r+b_r)}_{\Delta b_r}x_{\nu-r}+\underbrace{(a_0+b_0-1)}_{\Delta b_0}x_\nu \qquad r\neq 0 \qquad (3)$$

Note should be taken that the summation term in equation (3) is for values of r between $n$ and 1, rather than between $n$ and 0 as in equation (2).

If all $\Delta b_r$, i.e. all error settings of the coefficients of stages $B_r$, are zero, then $\Delta z_\nu$=0 and the distortion correction is complete. It then results that:

$$z_\nu-x_\nu=\Delta z_\nu=0;\ \text{or}$$
$$z_\nu=x_\nu \qquad (4)$$

This correct setting is attained by the distortion correction circuit in the following manner.

For any arbitrarily selected regulating coefficient $b_r=b_1$, i.e. $r$=1, the quantized signal amplitude $x_{\nu-1}$ is multiplied by a value corresponding to $\Delta z_\nu$ in multiplier $M_1'$. The output signal of the multiplier $M_1'$ is the voltage $U'_1$ represented, by derivation from equation (3), by:

$$U_1'=x_{\nu-1}\cdot\Delta z_\nu=\sum_{r=0}^{n}\Delta b_r x_{\nu-r}\cdot x_{\nu-1} \qquad (5)$$

If it is presupposed that all data signals $x_\nu$ are statistically independent of one another, i.e. have arbitrary discrete values and polarities with respect to one another, all products, when $U'_1$ is averaged with respect to time in integrator $I_1$, are averaged out except for those in which $x_{\nu-1} \cdot x_{\nu-1}$ appears. This product is always positive. Thus the average $\overline{U_1'}^t$ of equation (5) becomes:

$$\overline{U_1'}^t = \Delta b_1 \overline{x^2_{\nu-1}}^t = \Delta b_1 \overline{x^2}^t \quad (6)$$

where $\overline{x^2}^t$ is the root-mean-square value of the transmitted signals.

This correction voltage is thus, according to equation (6), a measure for the error value of coefficient $b_1$ and effects the correction of the voltage at the output of the integrator $I_1$ until $\Delta b_1=0$, i.e. $-b_1=a_1$, and thus $\overline{U_1'}^t=0$, at which time the voltage at the integrator output must be proportional to $b_1$ and this voltage then remains constant at the output of the integrator. The coefficient $b_1$ is now correctly set.

With regard to correct operation of the circuits according to the invention it is presumed, that the integrator $I_r$ has an opposite polarity relationship between the input and output signals. So the output signal of $I_r$ and also the coefficient $b_r$ becomes more negative with time if $\Delta b_r$ is positive in polarity.

A significant advantage of the quantization is that all coefficients $b_\nu$ are thus correctly set independently of one another.

Figure 4:
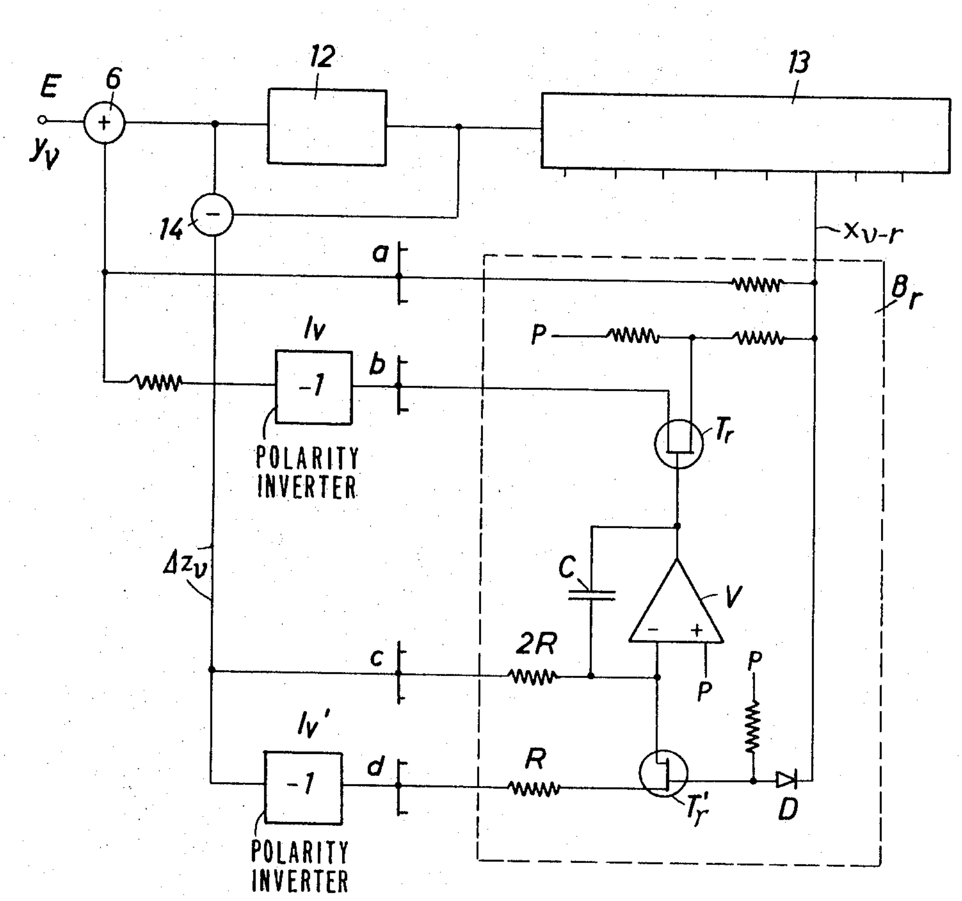
FIG. 4 is a detailed circuit diagram of an automatically adjustable evaluation member within a distortion correction circuit according to the present invention.

An advantageous specific embodiment of an automatically adjustable evaluation member according to the present invention is shown in FIG. 4 as the member $B_r$ which is representative of all of the members $B_0$ to $B_n$ and which is connected in a correction circuit identical with that of FIG. 3.

The evaluation member $B_r$ contains, as its basic elements, two field effect transistors Tr and Tr' which serve the function of the multipliers M and M', respectively, of the evaluation members of FIG. 3, as well as an amplifier V which constitutes, together with a parallel-connected capacitor C, the integrator circuit for the evaluation member.

The output voltage $x_{\nu-r}$ of the associated stage of shift register 13 is fed to the field effect transistor Tr' through a diode D in the form of a gating voltage. The voltage $\Delta z_\nu$ becomes the drain voltage for this field effect transistor Tr' after passing through a polarity inverter circuit Iv' and a resistor R and becomes the source voltage after passing through a resistor 2R which, as its designation indicates, has twice the resistance value of resistor R.

The end of resistor R connected to the transistor is also connected to the negative input of the amplifier V, which in this embodiment is a differential amplifier. Between this input and the output of the amplifier V the capacitor C is connected. The second input of the amplifier V is connected to a source of a reference potential P. This reference potential is also applied, through respective resistors, to the gate electrode of the field effect transistor Tr' and the drain electrode of the second field effect transistor Tr. To this latter electrode there is also applied, through a resistor, the output voltage of the associated stage of shift register 13.

The gate electrode of the second field effect transistor Tr is connected to the output of amplifier V, its source electrode is connected, via a polarity inverter circuit Iv and a resistor, to the summing circuit 6 to which is also fed the output voltage of the stage of shift register 13 which is associated with evaluation member $B_r$.

The unconnected line ends at points *a* through *d* of the distortion correction circuit according to FIG. 4 indicate that the corresponding connections are there made to the other evaluation members.

It will be understood that the above description of the present invention is susceptible to various modifications, changes and adaptations.

I claim:

1. In a distortion correction circuit for correcting linear distortions imparted during transmission to a signal pulse train composed of pulses having a predetermined number of discrete amplitude levels, which circuit includes: time delay means having an input and a plurality of outputs for imparting successive delays to a signal applied to its input and for delivering each successively delayed signal to a different respective output; a plurality of evaluation members each having an input connected to a respective output of said time delay means for modifying the signal applied to its input by a factor having an adjustable value; and summing means connected to receive the output signals from all of said evaluation members, the improvement wherein said summing means are also connected to receive a signal sequence obtained by periodically sampling the distorted signal pulse train and storing each sampled value until the next sampling, and wherein said circuit comprises quantization means connected between the input of said circuit and the input of said delay means for quantizing the signal which it receives into a predetermined number of discrete amplitude levels identical to those of the signal pulse train before distortion.

2. An arrangement as defined in claim 1 wherein said delay means are constituted by a shift register whose shift rate is synchronized with the periodic sampling of the signal pulse train.

3. An arrangement as defined in claim 2 further comprising subtraction means having respective inputs connected to the input and output of said quantization means and an output at which appears an error signal proportional to the difference between the signals at its inputs.

4. An arrangement as defined in claim 3 wherein each said evaluation member comprises: a first multiplier having one input connected to said subtraction means output and another input connected to said respective output of said time delay means; an integrator having its input connected to the output of said first multiplier; and a second multiplier having one input connected to the output of said integrator, another input connected to said respective output of said time delay means, and its output connected to the input of said summing means.

5. An arrangement as defined in claim 4 wherein at least one of said multipliers is composed of a field effect transistor.

6. An arrangement as defined in claim 1 wherein said quantization means has its input connected to the output of said summing means.

7. An arrangement as defined in claim 1 further comprising means connected to the input of said summing means for periodically sampling the distorted signal pulse train and storing the sampled values, and for delivering the resulting signal sequence to said summing means.